Figure 1:
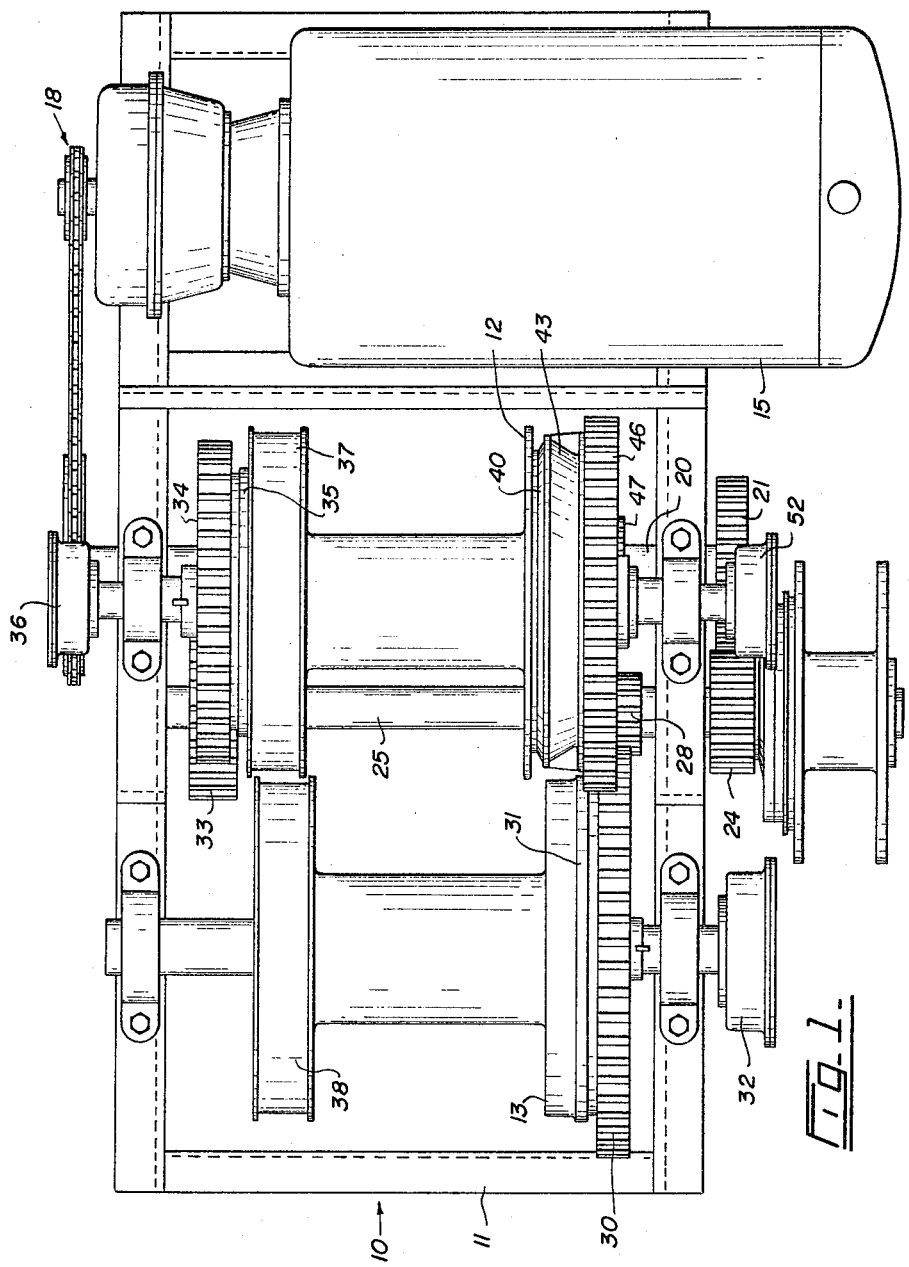

INVENTOR
JOHN R. WILSON

Aug. 23, 1966   J. R. WILSON   3,268,210
REGENERATIVE BRAKE FOR WINCH APPARATUS
Filed March 8, 1965   6 Sheets-Sheet 2
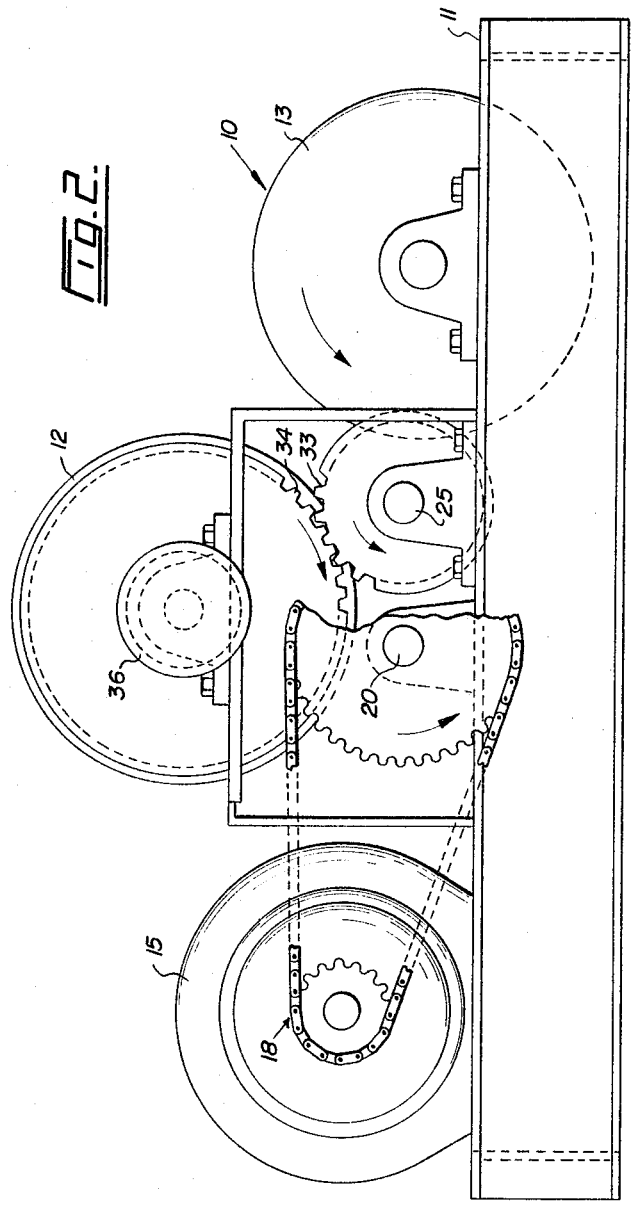
INVENTOR
JOHN R. WILSON
BY
Fetherstonhaugh & Co.
ATTORNEYS

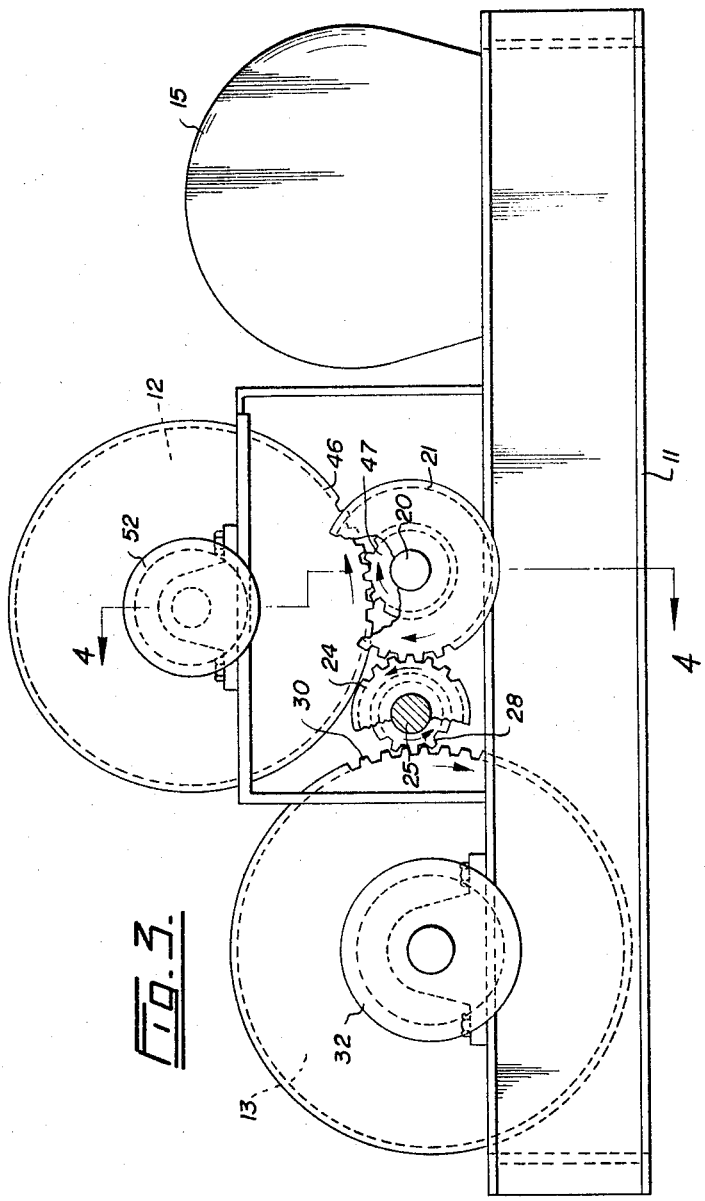

Aug. 23, 1966   J. R. WILSON   3,268,210
REGENERATIVE BRAKE FOR WINCH APPARATUS
Filed March 8, 1965   6 Sheets-Sheet 4
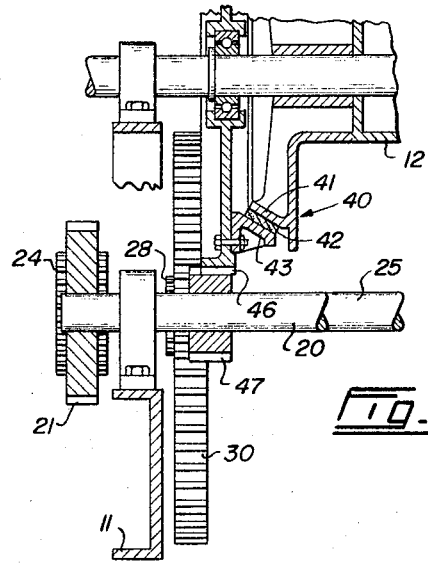
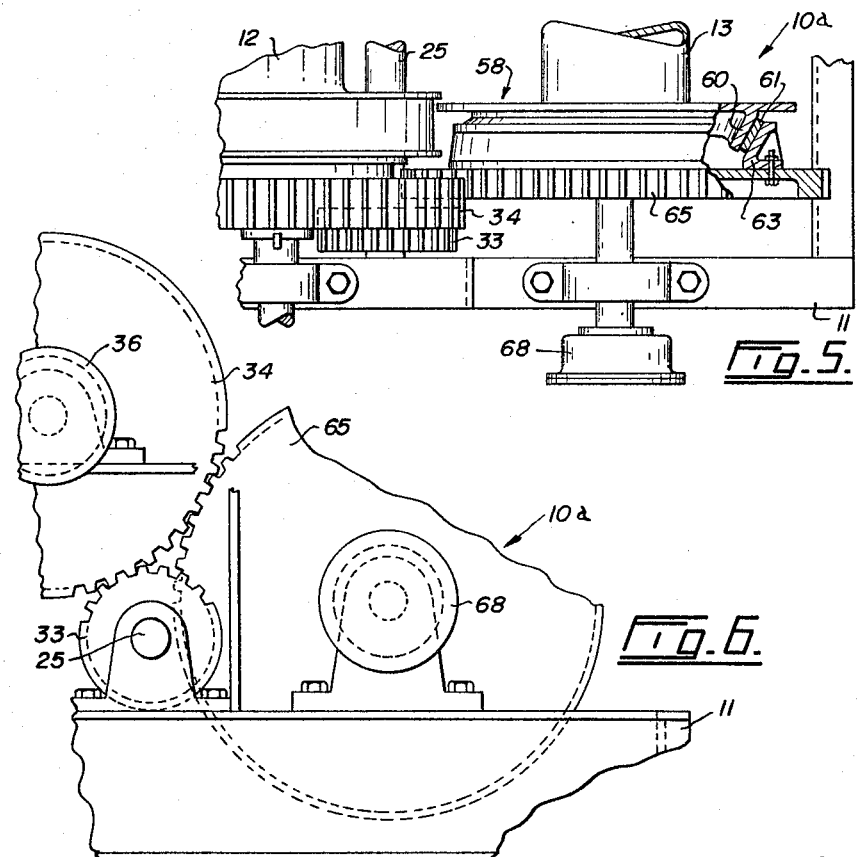
INVENTOR
JOHN R. WILSON
BY
Featherstonhaugh & Co.
ATTORNEYS

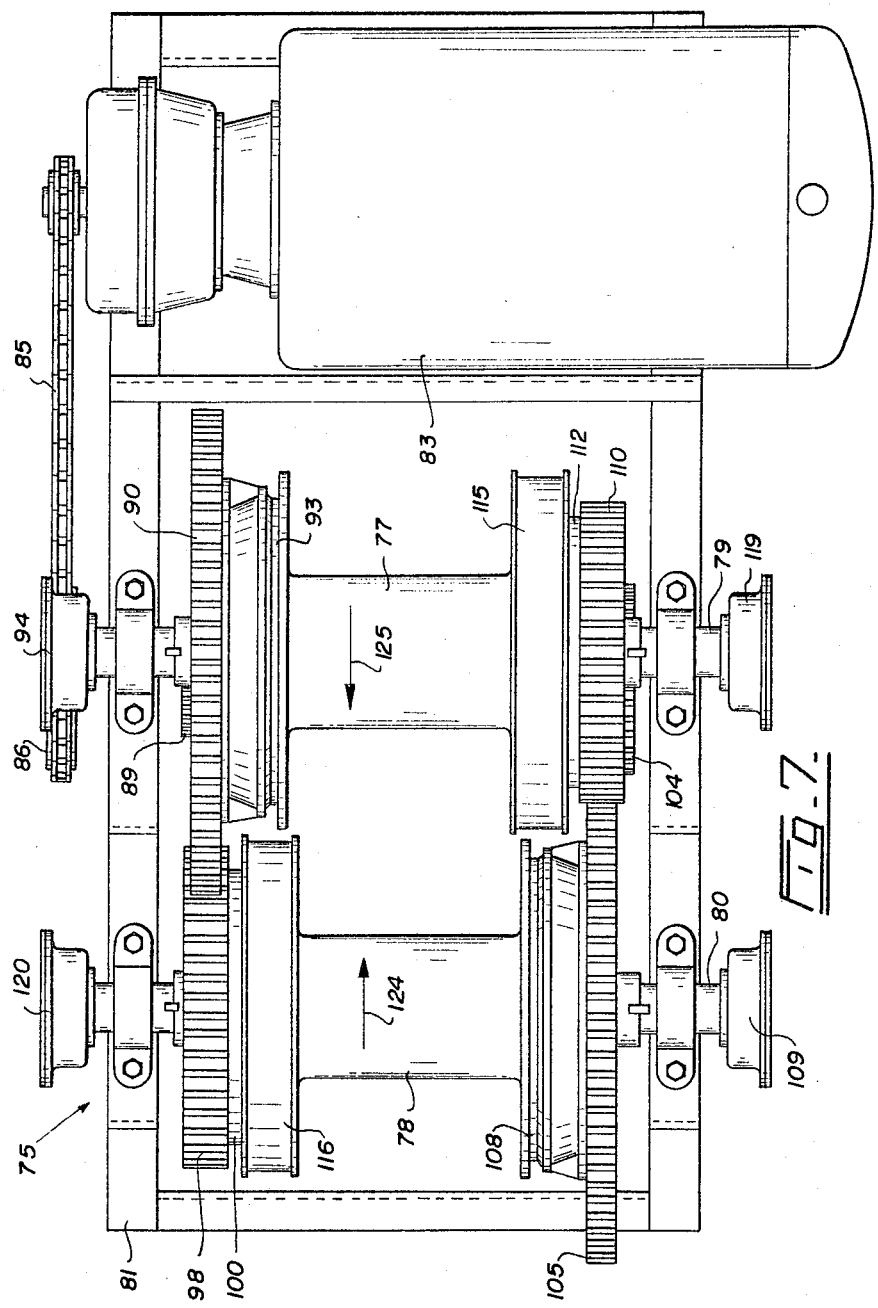

Aug. 23, 1966  J. R. WILSON  3,268,210
REGENERATIVE BRAKE FOR WINCH APPARATUS
Filed March 8, 1965  6 Sheets-Sheet 6

INVENTOR
JOHN R. WILSON
BY
Fetherstonhaugh & Co.
ATTORNEYS

United States Patent Office 3,268,210
Patented August 23, 1966

3,268,210
REGENERATIVE BRAKE FOR WINCH APPARATUS
John R. Wilson, Vancouver, British Columbia, Canada, assignor to Tyee Machinery Company, Limited, Vancouver, British Columbia, Canada, a corporation of British Columbia
Filed Mar. 8, 1965, Ser. No. 438,008
20 Claims. (Cl. 254—185)

This invention relates to winch apparatus having two drums, one of which is usually reeled in while the other is reeled out, and vice versa.

An object of the present invention is the provision of winch apparatus including power and brake saving apparatus whereby the wear and friction loss of the brake of either or both winches are greatly reduced, and the energy normally lost in the braking action is applied to the drum being reeled in.

Winch apparatus according to this invention may be used for shifting various types of loads back and forth, but it has been primarily designed for winches used in yarding logs in the logging industry, and it will be so described herein for the sake of convenience.

Yarding winches are all basically the same, each consisting of a main drum and a haulback drum which are selectively driven by means of clutches through a gear train from a suitable power unit. The gear train varies in the number of gears and sizes thereof in order to obtain the desired line pulls and speeds on the drums. All drums of the standard winches are equipped with band type brakes which control the drums when the lines are being paid out therefrom.

With one type of log yarding, the haulback line runs from the haulback drum to the top of a spar tree, and then out to the woods where it runs through two or more blocks to change its direction, and the outer end of this line is joined to the main line through what is known as butt rigging, which usually carries the choker line to be secured around the logs. This main line runs back to the top of the spar tree and down to the main drum of the winch. The logs are pulled in by the main line, and this action pulls the haulback line out. In order to control the logs at this time, the haulback drum brake is applied. This application of the haulback drum brake makes the main drum work harder, and heats up and wears out the haulback drum brakes. Thus, a great deal of energy is wasted as heat and wear. In conventional yarders, the haulback brake gets so hot that it has to be cooled by water.

The present invention eliminates most of this power loss and wear by utilizing a regenerative brake on the haulback drum in place of or in addition to the standard brake. This regenerative brake is arranged so that when the haulback line is pulled out by the reeling in of the main line, the resistance of the regenerative brake is utilized to help turn the main drum. Thus, the braking energy of the haulback drum is applied to the main drum to help the rotation thereof. The brake provides a variable regenerative drive between the haulback and main drums. This variable drive is necessary since the relative speeds of rotation of the two drums vary as line is wound on to one drum and off the other drum. Although there is some energy lost when the regenerative brake is allowed to slip in order to compensate for the different line speeds, this loss is infinitesimal compared to the losses in standard winches. The regenerative brake remains quite cool during operation without the use of cooling water, and it shows very litle sign of wear.

If desired, a regenerative brake may be used with both of the haulback and main drums, in which case, the energy developed by each regenerative brake during the unreeling of its drum is applied to the other drum as the latter is reeled in.

Figure 8:
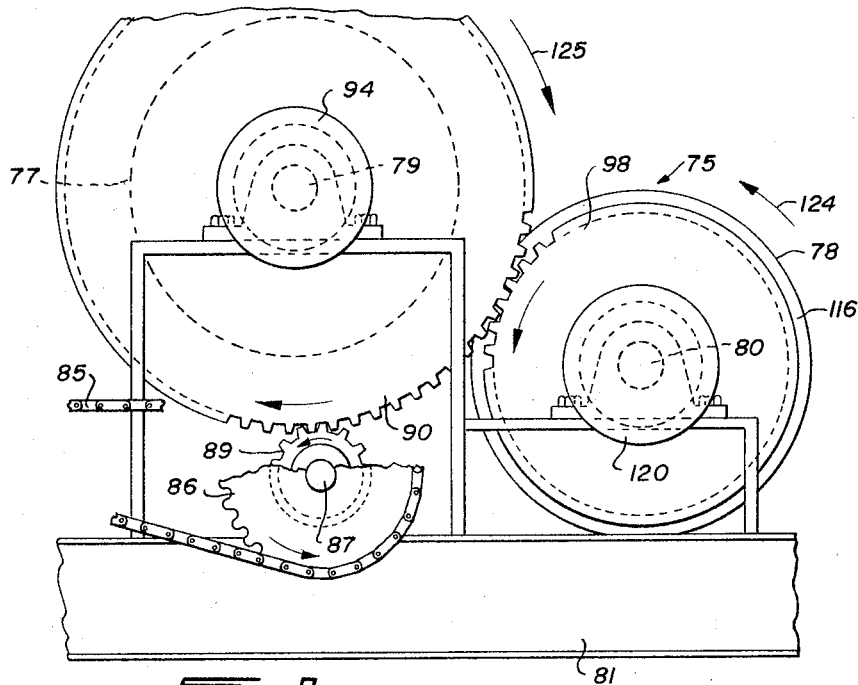
Figure 9:
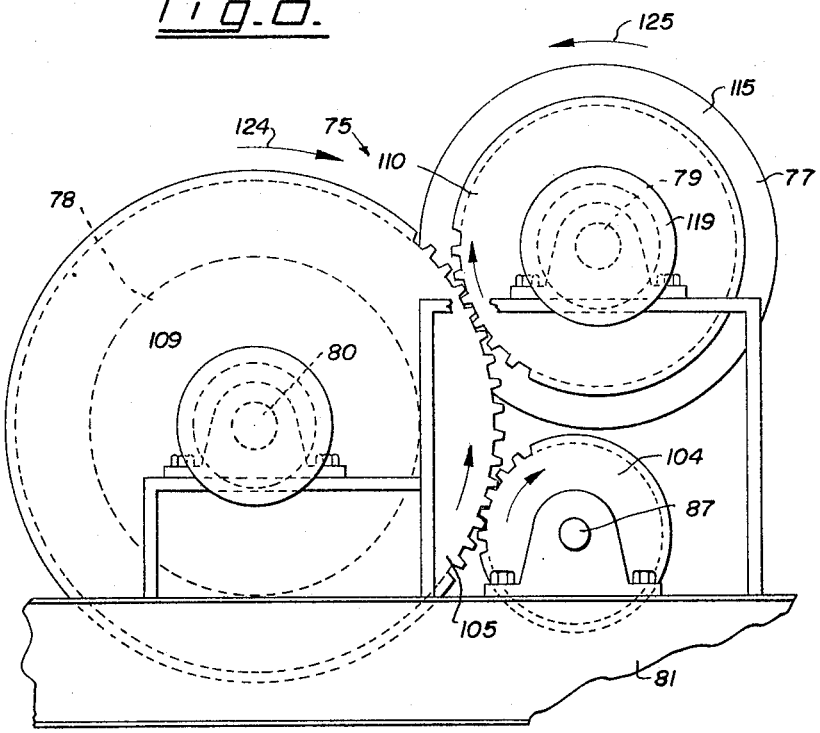

Two examples of this invention are illustrated in the accompanying drawings, in which, FIGURE 1 is a plan view of one embodiment of the invention, FIGURE 2 is an elevation of the side end of the apparatus, FIGURE 3 is an elevation of the opposite side of the apparatus, FIGURE 4 is a horizontal section taken on line 4—4 of FIGURE 3, FIGURE 5 is a fragmentary plan view, partly in section, of another embodiment of the invention, FIGURE 6 is an end elevation of the apparatus of FIGURE 5, FIGURE 7 is a plan view of still another embodiment of the invention, FIGURE 8 is an elevation of the winch of FIGURE 7 as viewed from the left side of the latter figure, and FIGURE 9 is an elevation of the opposite side of the invention to that shown in FIGURE 8.

Referring to FIGURES 1 to 4 of the drawings, 10 is a winch having a base 11 and parallel haulback and main drums 12 and 13 rotatably mounted on suitable side supports carried by said base. A suitable power unit, such as an internal combustion engine or electric motor 15, is mounted on base 11 near one end thereof. Any standard drive can be provided for drums 12 and 13. For example, power unit 15 through a drive 18 rotates power shaft 20 which extends beneath drum 12 and has a drive gear 21 on its opposite end. This gear 21 meshes with an idler gear 24 mounted on a cross or idler shaft 25 journalled in suitable bearings carried by base 11, said idler shaft having an idler gear 28 mounted thereon near gear 24 and meshing with a drum gear 30 which is adapted to drive drum 13 through the standard clutch 31. A standard shifter 32 is adapted to move gear 32 to engage and disengage clutch 31. Another idler gear 33 mounted on shaft 25 meshes with a drum gear 34 which in turn is adapted to drive drum 12 through a standard clutch 35. A standard shifter 36 is adapted to move gear 34 to engage and disengage clutch 35. If desired, drums 12 and 13 may be provided with the usual hand-operated brakes 37 and 38.

In winch 10, haulback drum 12 is provided with a regenerative brake 40. This brake may have any desired construction, but it preferably includes a cone face 41 mounted on the end of drum 12 remote from clutch 35 thereof and having molded wear blocks 42 fixedly mounted thereon. A brake shoe 43 surrounds the brake blocks 42 and is adapted to engage said blocks to effect therewith a braking action. The cross sectional angle of cone face 41, blocks 42 and shoe 43 is such that the brake will slip when the pressure which urges shoe 43 against the blocks is lowered.

Shoe 43 is carried by a gear 46 which meshes with another gear 47 mounted on power shaft 20. With this arrangement, rotation of gear 46 helps to rotate main drum gear 30 through the power train made up of gear 47, shaft 20, gears 21 and 24, shaft 25 and gear 28. A standard shifter 52 is provided for moving gear 46 laterally to engage and disengage brake 40. It will be understood that clutches 31 and 35 and brake 40 are controlled by the operator of the apparatus in the usual way. For example, the clutches and the brake may be operated by suitable air control means.

The operation of this apparatus is relatively simple. When it is desired to reel in the main line, clutch 31 is operated to cause the power unit 15 to rotate main drum 13. At this time, clutch 35 of haulback drum 12 is disengaged, and as it is usually necessary to control the load being hauled in by the main line, brake 40 is applied. This causes gear 46 of the brake to rotate, and the power generated by the braking action is applied through gears 47, 21, 24 and 28 to main drum gear 30, thereby assisting in the rotation of the main drum rather than wasting the energy in friction and wearing of the brake elements. It is necessary to provide for slippage at the brake since the speed of the main line being drawn in by the main drum is constantly changing relative to the speed of paying out the haulback line from drum 12 because of the piling up of line on drum 13 and the loss of line from the haulback drum. For example, the driving gearing of the drums and the diameters of said drums may be such that when the main line is 80% out, the haulback line is 50% out. At this time, when the regenerative brake 40 is applied, the haulback line and main line are moving at the same speed without any slippage in the brake. As the main line continues to be reeled in and the haulback line to be reeled out, the ratio changes with the changes in the amount of line on the drums. At this time, the regenerative brake is allowed to slip just enough to hold the lines tight. This slipping causes some wear and heat, but it is so little as compared to the heat and wear of a standard haulback drum brake that it creates no real problem.

If desired, a regenerative brake may be supplied for main drum 13, and an example of this is illustrated in FIGURES 5 and 6. Winch 10a has a regenerative brake 58 at the end of main drum 13 remote from the end which engages clutch 31. The illustrated brake is similar to above-described brake 40. Brake 58 includes a cone face 60 having molded wear blocks 61 secured to the outer face thereof, said blocks being surrounded and engaged by a shoe 63. The angle of cone 60, blocks 61 and shoe 63 is such that the brake will slip when the pressure which urges the shoe against the blocks is lowered. Shoe 63 is carried by a large gear 65 freely mounted on the shaft of drum 13, said gear meshing with gear 34 of haulback drum 12. A standard pneumatic shifter 68 is provided for applying brake 58.

The regenerative brake 58 of winch 10a makes it possible to brake main drum 13 when the main line is being hauled therefrom by haulback drum 12, which is reeling in at this time. When brake 58 is applied, gear 65 starts to turn with drum 13 and this, in turn, rotates gear 34 so that the energy utilized in braking drum 13 is applied to drum 12. Thus, either drum of winch 10a can be rotated to reel its line thereon and at the same time unreel the line of the other drum while the regenerative brake of the latter drum is applied, thereby using the power generated by the braking action to help rotate the former drum. It is obvious that regenerative brake 40 may be omitted if it is not required in winch 10a.

FIGURES 7 to 9 illustrate an alternative form of the invention in a winch 75. This winch includes haulback and main drums 77 and 78 respectively mounted for rotation on shafts 79 and 80 which are carried by suitable side supports mounted on a base 81. A suitable power unit, such as an internal combustion engine 83, is mounted on one end of base 81 and is operatively connected by a chain drive 85 to a sprocket 86 mounted on a power shaft 87 which is rotatably mounted in suitable bearings beneath drum 77 and extends transversely of the winch. A small drive gear 89 mounted on shaft 87 near sprocket 86 meshes with a large gear 90 rotatably mounted on shaft 79 adjacent an end of drum 77. A regenerative brake 93 similar to brake 40 described above is adapted to be operated to connect drum 77 to gear 90 while permitting slippage therebetween. A standard shifter 94 is provided for moving gear 90 laterally to engage and disengage brake 93.

Large gear 90 meshes with a smaller gear 98 rotatably mounted on shaft 80 adjacent an end of drum 78. Gear 98 is adapted to rotate drum 78 through a standard clutch 100.

At the opposite side of the winch, a drive gear 104 fixedly mounted on power shaft 87 meshes with a large gear 105 rotatably mounted on shaft 80, said gear 105 being adapted to be connected to drum 78 by a regenerative brake 108 which is similar to brake 93. A standard shifter 109 is provided by moving gear 105 to engage and disengage brake 108.

Gear 105 meshes with a smaller gear 110 rotatably mounted on shaft 79 and adapted to drive drum 77 through a standard clutch 112. Drums 77 and 78 are provided with the usual hand-operated brakes 115 and 116 adjacent clutches 112 and 100 respectively. Standard shifters 119 and 120 are provided for moving gears 110 and 98 to engage and disengage clutches 112 and 100, respectively.

The operation of winch 75 is as follows:

Power unit 83 rotates sprocket 86 through chain drive 85 and this, in turn, rotates power shaft 87 and drive gears 89 and 104. When clutches 100 and 112 are disengaged and brakes 93 and 108 are released, drums 77 and 78 remain stationary. When clutch 100 or clutch 112 is engaged, drum 78 or drum 77 respectively is rotated to wind a line or cable thereon. When the winch is used in logging, the outer ends of these lines are interconnected in a suitable manner, such as by means of a skyline carriage. Drum 78 usually has a main line wound thereon, and drum 77 a haulback line. When drum 78 is rotated in the direction of arrow 124, see FIGURE 7, to wind in its line, drum 77 is released so that the haulback line is drawn off it in the direction of arrow 125. This action is reversed when the line is wound on to drum 77 and drum 78 is released.

When it is desired to haul in a load, drum 78 is rotated to reel in the main line by engaging clutch 100. At this time, power shaft 87 rotates gears 89–90 and 98 to rotate drum 78. If it is desired to steady the load through the haulback line on drum 77, regenerative brake 93 is applied to resist rotation of drum 77 in the direction of arrow 125. The power generated by the braking action is applied to gear 90, and this assists in the rotation of main drum 78. Regenerative brake 108 and clutch 112 are released at this time.

If it is desired to reel in the haulback line by drum 77 and simultaneously to retard the unreeling of the main line from drum 78, clutch 112 is engaged. At this time power shaft 87 rotates drum 77 through gears 104, 105 and 110. When regenerative brake 108 is applied, it resists the rotation of drum 78. The power generated by this braking action is applied to gear 105 and thereby assists in the rotation of haulback drum 77. Regenerative brake 93 and clutch 100 are released at this time.

If desired, either of the regenerative brakes 93 or 108 may be omitted, in which case only one of the drums could be subjected to the regenerative brake action which helps to rotate the other drum.

The results attained by winch 75 are similar to those of winch 10 or 10a. However, the power train or drums 77 and 78 is much simpler than that of either of the other two winches.

What I claim as my invention is:

1. Winch apparatus comprising first and second rotatably mounted substantially parallel drums adapted to have a line extending from the first drum out to do a job and back to the second drum, said line being drawn from the first drum as it is wound on the second drum and vice versa, a first gear train at adjacent ends of the drums for rotating the first drum through a clutch, a second gear train at opposite ends of the drums operated by said first gear train to rotate the second drum through a clutch, a regenerative brake including first and second engageable braking elements, said first braking elements being mounted on said adjacent end of the second drum, said brake when the braking elements thereof are engaged being adapted to rotate with the second drum, gearing connected to the second braking element and to the first gear train for applying power to said first train when said brake rotates with the second drum, and means for engaging the first and second braking elements of said regenerative brake to cause the latter to rotate with the second drum when the line is being wound on to the first drum to retard rotation of said second drum by assisting the rotation of the first drum through the brake and said gearing.

2. Apparatus as claimed in claim 1 in which the braking elements of the regenerative brake comprise a cone face mounted to rotate with the second drum, and a shoe surrounding and inclined to correspond with the cone face and adapted to be moved into engagement therewith, and said brake includes a gear carrying said brake shoe, said gear forming part of said gearing.

3. Winch apparatus comprising first and second rotatably mounted substantially parallel drums adapted to have a line extending from the first drum out to do a job and back to the second drum, said line being drawn from the first drum as it is wound on the second drum and vice versa, a first gear train at adjacent ends of the drums for rotating the first drum through a clutch, a second gear train at opposite ends of the drums operated by said first gear train to rotate the second drum through a clutch, a first regenerative brake at said adjacent ends of the drums for the second drum adapted when applied to rotate therewith, a second regenerative brake at said opposite ends of the drums for the first drum adapted when applied to rotate therewith, first gearing connected to the first brake and the first gear train for applying power to said first gear train when said first brake rotates with the second drum, second gearing connected to the second brake and the second gear train for applying power to said second gear train when said second brake rotates with the first drum, and means for applying the first or second brake to the drum thereof when the line is being wound on to the first or second drum respectively to retard rotation of said second or first drum by assisting the rotation of the first or second drum through the first or second gearing respectively.

4. Apparatus as claimed in claim 3 in which each regenerative brake comprises a cone face mounted to rotate with the drum of said brake, a brake shoe surrounding and inclined to correspond with the cone face and adapted to engage the latter, and a gear carrying said shoe, said gear forming part of said gearing connected to said brake.

5. Winch apparatus comprising first and second rotatably mounted substantially parallel drums adapted to have a line extending from the first drum out to do a job and back to the second drum, said line being drawn from the first drum as it is wound on the second drum and vice versa, a power shaft to be rotated by a source of power, a drive gear at adjacent ends of the drums and mounted on the power shaft, an idler shaft, first idler gearing mounted on the idler shaft meshing with the drive gear, a drum gear meshing with said idler gearing and connectable with the first drum through a clutch, a drum gear connectable through a clutch with the second drum at an opposite end thereof, a second idler gear mounted on the idler shaft and meshing with the last-mentioned drum gear, a regenerative brake at said adjacent ends of the drums for the second drum adapted when applied to rotate therewith, a gear connected to and rotatable with said brake, another gear mounted on the power shaft and meshing with said brake gear, and means for applying said regenerative brake to the second drum when the line is being wound on to the first drum to retard rotation of said second drum by assisting the rotation of the first drum through the brake, the brake gear and the gear on the drive shaft meshing therewith.

6. Apparatus as claimed in claim 5 in which the regenerative brake comprises a cone face mounted to rotate with the second drum, wear blocks mounted on the surface of said cone face, and a brake shoe surrounding and inclined to correspond with the cone face and adapted to bear against said blocks, said brake shoe being mounted on said gear rotatable with the brake.

7. Winch apparatus comprising first and second rotatably mounted substantially parallel drums adapted to have a line extending from the first drum out to do a job and back to the second drum, said line being drawn from the first drum as it is wound on the second drum and vice versa, a power shaft to be rotated by a source of power, a drive gear at adjacent ends of the drums and mounted on the power shaft, an idler shaft, first idler gearing mounted on the idler shaft meshing with the drive gear, a drum gear meshing with said idler gearing and connectable with the first drum through a clutch, a drum gear connectable through a clutch with the second drum at an opposite end thereof, a second idler gear mounted on the idler shaft and meshing with the last-mentioned drum gear, a regenerative brake including first and second engageable braking elements, said first braking element being mounted on said adjacent end of the second drum, said brake when the braking elements thereof are engaged being adapted to rotate with the second drum, a gear connected to and rotatable with the second braking element, another gear mounted on the power shaft and meshing with said braking element gear, and means for engaging the first and second braking elements of said regenerative brake to cause the latter to rotate with the second drum when the line is being wound on to the first drum to retard rotation of said second drum by assisting the rotation of the first drum through the brake, the brake elements gear and the gear on the drive shaft meshing therewith.

8. Apparatus as claimed in claim 7 in which the braking elements of the regenerative brake comprises a cone face mounted to rotate with the second drum and having wear blocks mounted on the surface thereof, and a brake shoe surrounding and inclined to correspond with the cone face and adapted to bear against said blocks, said brake shoe being mounted on said gear rotatable with the second braking element.

9. Winch apparatus comprising first and second rotatably mounted substantially parallel drums adapted to have a line extending from the first drum out to do a job and back to the second drum, said line being drawn from the first drum as it is wound on the second drum and vice versa, a power shaft to be rotated by a source of power, a drive gear at adjacent ends of the drums and mounted on the power shaft, an idler shaft, first idler gearing mounted on the idler shaft meshing with the drive gear, a drum gear meshing with said idler gearing and connectable with the first drum through a clutch, a drum gear connectable through a clutch with the second drum at an opposite end thereof, a second idler gear mounted on the idler shaft and meshing with the last-mentioned drum gear, a first regenerative brake at said adjacent ends of the drums for the second drum adapted when applied to rotate therewith, a brake gear connected to and rotatable with said brake, another gear mounted on the power shaft and meshing with said brake gear, a second regenerative brake at said opposite ends of the drums for the first drum adapted when applied to rotate therewith, a second brake gear connected to and rotatable with said second brake and meshing with said second idler gear on the idler shaft, and means for selectively applying said first or second regenerative brake respectively to the second or first drum when the line is respectively being wound on to the first or second drum to retard rotation of said second or first drum by assisting the rotation of the first or second drum through the regenerative brake thereof and the brake gear of the latter brake.

10. Apparatus as claimed in claim 9 in which each regenerative brake comprises a cone face mounted to rotate with the drum of said brake, wear blocks mounted on the cone face, and a brake shoe surrounding and angled to correspond with said cone face and adapted to engage said blocks, said brake shoe being mounted on said gear rotatable with said brake.

11. Winch apparatus comprising first and second rotatably mounted substantially parallel drums adapted to have a line extending from the first drum out to do a job and back to the second drum, said line being drawn from the first drum as it is wound on the second drum and vice versa, a first gear train at adjacent ends of the drums for rotating the first drum through a clutch, a second gear train at opposite ends of the drums operated by said first gear train to rotate the second drum through a clutch, a regenerative brake including first and second engageable braking elements, said first braking elements being mounted on said adjacent end of the second drum and said second braking element being connected to the first gear train, said brake when the braking elements thereof are engaged being adapted to rotate with the second drum and to help rotate the first drum through the first gear train, and means for engaging the first and second braking elements of said regenerative brake to cause the latter to rotate with the second drum when the line is being wound on to the first drum to retard rotation of said second drum by assisting the rotation of the first drum through the brake and said first gear train.

12. Apparatus as claimed in claim 11 in which the braking elements of the regenerative brake comprises a cone face mounted to rotate with the second drum, and a shoe surrounding and inclined to correspond with the cone face and adapted to be moved into engagement therewith, and said brake includes a gear carrying said brake shoe, said gear forming part of said first gear train.

13. Winch apparatus comprising first and second rotatably mounted substantially parallel drums adapted to have a line extending from the first drum out to do a job and back to the second drum, said line being drawn from the first drum as it is wound on the second drum and vice versa, a first gear train at adjacent ends of the drums for rotating the first drum through a clutch, a second gear train at opposite ends of the drums operated by said first gear train to rotate the second drum through a clutch, a first regenerative brake including first and second engageable braking elements, said first braking element being mounted on said adjacent end of the second drum and said second braking element being connected to the first gear train, said brake when the braking elements thereof are engaged being adapted to rotate with the second drum and to help rotate the first drum through the first gear train, a second regenerative brake including first and second engageable braking elements, the first braking element of said second brake being mounted on said opposite end of the first drum and said second braking element of the second brake being connected to the second gear train, said second brake when the braking elements thereof are engaged being adapted to rotate with the first drum and to help rotate the second drum through the second gear train, first means for engaging the first and second braking elements of said first regenerative brake to cause the latter to rotate with the second drum when the line is being wound on to the first drum to retard rotation of said second drum by assisting the rotation of the first drum through the first brake and said first gear train, and second means for engaging the first and second braking elements of said second regenerative brake to cause the latter to rotate with the first drum when the line is being wound on to the second drum to retard rotation of the first drum by assisting the rotation of the second drum through the second brake and said second gear train.

14. Apparatus as claimed in claim 13 in which each regenerative brake comprises a cone face mounted to rotate with the drum of said brake, a brake shoe surrounding and inclined to correspond with the cone face and adapted to engage the latter, and a gear carrying said shoe, said gear forming part of said gearing connected to said brake.

15. Winch apparatus comprising first and second rotatably mounted substantially parallel drums adapted to have a line extending from the first drum out to do a job and back to the second drum, said line being drawn from the first drum as it is wound on the second drum and vice versa, a power shaft adapted to be rotated by a source of power, a first drive gear at adjacent ends of the drums and mounted on the power shaft, a first drum gear meshing with said first drive gear, a second drum gear meshing with said first drum gear and connectable through a clutch with the first drum at said adjacent end thereof, a regenerative brake between said first drum gear and the second drum adapted when applied to rotate with the latter and to cause said first drum gear to rotate, a second drive gear mounted on the power shaft at opposite ends of the drums, a third drum gear adjacent said opposite ends of the drums and meshing with said second drive gear, a fourth drum gear meshing with said third drum gear and connectable through a clutch with the second drum, and means for applying said regenerative brake when the line is being wound on to the first drum to retard rotation of said second drum by assisting the rotation of the first drum through the brake and said first drum gear.

16. Apparatus as claimed in claim 15 including a second regenerative brake between said third drum gear and the first drum adapted when applied to rotate with the latter and to cause said fourth drum gear to rotate, and second means for applying said second regenerative brake when the line is being wound on to the second drum to retard rotation of the first drum by assisting rotation of the second drum through said second brake and said fourth drum gear.

17. Winch apparatus comprising first and second rotatably mounted substantially parallel drums adapted to have a line extending from the first drum out to do a job and back to the second drum, said line being drawn from the first drum as it is wound on the second drum and vice versa, a power shaft adapted to be rotated by a source of power, a first drive gear at adjacent ends of the drums and mounted on the power shaft, a first drum gear meshing with said first drive gear, a second drum gear meshing with said first drum gear and connectable through a clutch with the first drum at said adjacent end thereof, a regenerative brake including first and second engageable braking elements, said first braking element being mounted on said adjacent end of the second drum and said second braking element being connected to the first drum gear, said brake when the braking elements thereof are engaged being adapted to rotate with the second drum and to help rotate the first drum through the first drum gear, a second drive gear mounted on the power shaft at opposite ends of the drums, a third drum gear adjacent said opposite ends of the drums and meshing with said second drive gear, a fourth drum gear meshing with said third drum gear and connectable through a clutch with the second drum, and means for engaging the first and second braking elements of said regenerative brake to cause the latter to rotate with the second drum when the line is being wound on to the first drum to retard rotation of said second drum by assisting the rotation of the first drum through the brake and said first drum gear.

18. Apparatus as claimed in claim 17 in which the braking elements of the regenerative brake comprise a cone face mounted to rotate with the second drum, and a shoe surrounding and inclined to correspond with the cone face and adapted to be moved into engagement therewith.

19. Apparatus as claimed in claim 17 including a second regenerative brake including first and second engageable braking elements, said first braking element of the second brake being mounted on said opposite end of the first drum and said second braking elements of the second brake being connected to the third drum gear, said second brake when the braking elements thereof are engaged being adapted to rotate with the first drum and to help rotate the second drum through said third gear, and second means for engaging the first and second braking elements of said second brake to cause the latter to rotate with the first drum when the line is being wound on the second drum to retard rotation of said first drum by assisting the rotation of the second drum through said second brake and the third drum gear.

20. Apparatus as claimed in claim 19 in which each regenerative brake comprises a cone face mounted to rotate with the drum of said brake, wear blocks mounted on the cone face, and a brake shoe surrounding and angled to correspond with said cone face and adapted to engage said blocks, said brake shoe being mounted on said gear rotatable with said brake.

References Cited by the Examiner
UNITED STATES PATENTS
1,979,780  11/1934  Turney _____ 254—187

SAMUEL F. COLEMAN, *Primary Examiner.*